United States Patent [19]

Hastings

[11] Patent Number: 4,879,320
[45] Date of Patent: Nov. 7, 1989

[54] INTUMESCENT FIRE-RETARDANT COATING MATERIAL

[76] Inventor: Otis H. Hastings, 130 E. Crescent Ave., Mahwah, N.J. 07430

[21] Appl. No.: 323,806

[22] Filed: Mar. 15, 1989

[51] Int. Cl.$^4$ ............................................. C08K 21/14
[52] U.S. Cl. ...................................... 523/179; 521/91; 521/92; 521/149; 521/154; 521/178; 521/906; 521/907
[58] Field of Search .................... 523/179; 521/91, 92, 521/149, 154, 178, 906, 907

[56] References Cited

U.S. PATENT DOCUMENTS

| | | | |
|---|---|---|---|
| 3,284,216 | 11/1966 | Benjamin B. Kaplan | 252/606 |
| 3,513,114 | 5/1970 | Frank J. Hahn, et al. | 252/606 |
| 3,755,223 | 8/1973 | Engel | 523/179 |
| 3,849,178 | 11/1974 | Rubin Feldman | 252/606 |
| 3,875,106 | 4/1975 | Lazzaro | 523/179 |
| 3,916,057 | 10/1975 | Robert A. Hatch, et al. | 252/606 |
| 3,983,082 | 9/1976 | Richard D. Pratt, et al. | 252/606 |
| 4,018,983 | 4/1977 | J. Watson Pedlow | 252/606 |
| 4,031,059 | 6/1977 | Strauss | 523/179 |
| 4,077,921 | 3/1978 | Sharpe | 523/179 |
| 4,101,475 | 7/1978 | Stalego | 523/179 |
| 4,104,073 | 8/1978 | Yooichi Koide, et al. | 252/606 |
| 4,118,325 | 10/1978 | Donald E. Becker, et al. | 252/606 |
| 4,297,252 | 10/1981 | Arndt C. Caesar, et al. | 252/606 |
| 4,381,716 | 5/1983 | Otis H. Hastings, et al. | 109/2 |
| 4,588,523 | 5/1986 | Irving Tashlick, et al. | 252/606 |
| 4,595,714 | 6/1986 | McAllister | 523/179 |
| 4,656,095 | 4/1987 | McAllister et al. | 523/179 |

Primary Examiner—Morton Foelak
Attorney, Agent, or Firm—Ezra Sutton

[57] ABSTRACT

A fire-retardant coating material includes a fluid intumescent material and refractory fibers of various sizes dispersed or suspended therein for particular applications. The fluid intumescent material includes a foaming agent, a blowing agent gas source, a carbonific or charring agent, a film-forming binder, a solvent and, in some cases, a pigment or filler. The refractory fibers consist of aluminum oxide, silicon dioxide, and one or more other metal oxides.

46 Claims, 1 Drawing Sheet

INTUMESCENT FIRE-RETARDANT COATING MATERIAL

FIELD OF THE INVENTION

The present invention relates to a fire-retardant composition which includes a fluid intumescent base material and a refractory fibrous material dispersed therein to be used as a protective coating for various substrates.

BACKGROUND OF THE INVENTION

Intumescent materials have been known for many years and have been developed to the point where some claim to provide thermal protection up to approximately 2000° F. However, this is not a sufficiently high level of fire protection in a number of environments, including home, office, and industrial applications.

Accordingly, it is an object of the present invention to provide an improved fire-retardant coating material that is effective at continuously-maintained temperatures at least as high as 4000° F. and that can be used in a number of different applications to protect various types of substrates.

It is a further object of the invention to provide an improved fire-retardant coating material that has a fluid consistency and includes a novel combination of an intumescent material and refractory fibrous material dispersed therein, and wherein the size of the fibers may be varied to vary the consistency of the composition from a sprayable fluid to a thick fluid which is applied by a trowel.

SUMMARY OF THE INVENTION

In the present invention, there is provided a fire-retardant coating material which includes a fluid intumescent material and refractory fibers of various sizes dispersed or suspended therein for particular applications. The fluid intumescent material includes a foaming agent, a blowing agent gas source, a carbonific or charring agent, a film-forming binder, a solvent and, in some cases, a pigment or filler. The refractory fibers consist of aluminum oxide, silicon dioxide, and one or more other metal oxides.

In certain applications, such as housing and building frames to be coated, short refractory fibers having a bulk length of 1/32" to 1" are employed. In other applications, such as commercial and industrial, longer fibers are employed having a bulk length of 1" to 4" to provide a thicker coating consistency, which, in some cases, can be applied by using a trowel. In applications such as interior finished surfaces and fabrics, milled fibers are employed to provide a coating having a consistency which can be applied by painting or spraying and provides a fine or smooth finish, whereas the larger size bulk fibers provide a somewhat coarser finish or coating. In this manner, different size bulk fibers are employed, depending on the substrate to be protected by the fire-retardant coating material of the present invention.

The present invention provides superior thermal protection at continuously-maintained temperatures at least as high as 4000° F.

BRIEF DESCRIPTION OF THE DRAWINGS

Further objects, features, and advantages of the present invention will become apparent upon consideration of the detailed description of the presently-preferred embodiments, when taken in conjunction with the accompanying drawings, wherein.

DESCRIPTION OF PREFERRED EMBODIMENTS OF THE INVENTION

Figure 1:
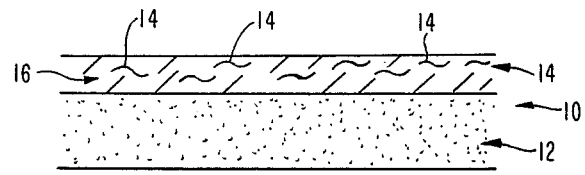
FIG. 1 is a diagrammatic illustration of the fire-retardant coating material of the present invention applied to a substrate.

In the present invention, in the preferred embodiment, the fluid intumescent base material consists of the following:

| Compound | Range (by weight) |
| --- | --- |
| Foaming agent, such as monoammonium phosphate, diammonium phosphate, ammonium polyphosphate, or potassium tripolyphosphate, or combinations thereof (in powder form or granules) | 10% to 40% |
| Carbonific or charring agent, such as dipentaerythritol (DPE), polyol, or chlorinated paraffin, or combinations thereof (granules) | 4% to 35% |
| Blowing agent gas source, such as melamine resin, urea, or dicyandiamide (granules), or combinations thereof | 5% to 35% |
| Film-forming binder, such as polyvinyl acetate, acrylic resin, vinyl acrylic resin, silicone resin, epoxy, or polyurethane, or combinations thereof | 1% to 50% |
| Solvent, such as water, alcohols, napthas, or aromatic hydrocarbons, or combinations thereof, to produce a fluid consistency | 10% to 60% |
| Pigments, such as $TiO_2$, ZnO, silicates, carbon black, lamp black, phthalocyanine blue or green, fillers, such as $CaCO_3$ or barytes, or combinations thereof | 0% to 40% |

In the present invention, in the preferred embodiment, the refractory or ceramic fibrous material consists of fibers made of the following compounds:

| Compounds | Range (by weight) |
| --- | --- |
| Aluminum Oxide ($Al_2O_3$) | 40% to 55% |
| Silicon Dioxide ($SiO_2$) | 40% to 55% |
| Ferric Oxide ($Fe_2O_3$) | 0.02% to 0.1% |
| Titanium Dioxide ($TiO_2$) | 0.01% to 0.1% |
| Potassium Oxide ($K_2O$) | 0.01% to 0.1% |
| Sodium Oxide ($Na_2O$) | 0.1% to 0.3% |
| Zirconium Oxide ($ZrO_2$) | 0.1% to 0.3% |

Additional compounds, which may be used in the present invention in addition to the above, are as follows: oxides of one or more metals, such as boron, beryllium, hafnium, magnesium, calcium, strontium, barium, scandium, yttrium, lanthanum, cesium, vanadium, niobium, tantalum, chromium, molybdenum, tungsten, manganese, cobalt, nickel, copper, zinc, lead, thorium, and the like. Illustrative of the foregoing oxides are BeO, MgO, CaO, SrO, BaO, $SiO_3$, $Y_2O_3$, $LanO_2$, $V_2O_3$, $Na_2O_3$, $Ta_2O_3$, $CrO_2$, $HfO_2$, $MoO_2$, $WO_2$, $FeO_2$, $Co_2O_3$, $Ni_2O_2$, CuO, ZnO, and CdO. Other oxides that may be present in combination with one or more of the foregoing oxides, are illustratiely $B_2O_3$ and $P_2O_5$.

In the preferred embodiment, the refractory fibrous material consists of at least aluminum oxide and silicon dioxide and one or more of the above-listed compounds.

Depending on which refractory fibrous material is used, the composition of the present invention has a number of different applications and uses.

For example, when the refractory fibrous material is composed of milled fibers or small granules, having a diameter in bulk of 2 to 10 microns and a length in bulk of 2 to 35 microns, the composition of the present invention provides a finish which is smooth and is best suited for painting or spraying on interior walls of elevators, houses, office buildings, and vehicles, such as buses, planes, trains, and cars, or the like. Pigment of any desired color may be added for decorating purposes. In addition, the composition composed of milled fibers has application to all types of fabrics, for use on such things as couches, seats, drapes, carpets, mattresses, furniture, and clothing.

In another embodiment, when the refractory fibrous material is composed of short fibers having a bulk diameter of 1/32" to $\frac{1}{4}$" and a length in bulk of 1/32" to 1", the composition of the present invention is best suited for spraying onto frames of residential structures, such as 2×4's and the like, before the frames are closed up. It is also useful on fire walls for various types of vehicles.

In still another embodiment, when the refractory fibrous material is composed of long fibers having a bulk diameter of $\frac{1}{4}$" to $\frac{1}{2}$" and a length in bulk of 1" to 4" and, in some cases, even longer, the composition of the present invention is best suited for industrial and commercial applications, such as structural beams and columns, floors, ceilings, elevator shafts, pipes, electrical cables, ducts, fire doors, stair wells, passageways, boiler rooms, electrical closets, electrical panel boards, and the like.

In the present invention, the combination of refractory fibrous material and intumescent base material can be used as an effective fire-retardant material at continuously-maintained temperatures at least as high as 4000° F. There is a preferred range of density for fibers in the fire-retardant composition of the present invention. For each one gallon of intumescent base material, the range of fibers to be included (including milled fibers, short fibers, and/or long fibers) is in the range of one (1) ounce to to eighty (80) ounces. In the preferred embodiment of the invention, the range is six (6) ounces to twenty (20) ounces of fibers for each gallon of intumescent material. And as explained herein, 16 ounces of fibers for each gallon of intumescent material is best suited for a number of uses.

The following examples illustrate the practice of this invention:

EXAMPLE I

A gallon of the intumescent material of the invention is mixed with 8 ounces of milled fibers and 8 ounces of short strand fibers ($\frac{1}{4}$" to $\frac{1}{2}$" bulk length) using an air jet. The composition is applied as a coating to an aluminum sample 4" by 12" having a thickness of 0.060". The composition is applied to a thickness of 0.250" to only one-half of one side of the aluminum sample. A propane torch, having a flame temperature of about 2600° F., is applied for one (1) hour to the surface of the aluminum sample covered with the composition. The composition swelled and became charred. After the test was concluded, the charred composition was scraped off and the aluminum sample observed. Both surfaces of the aluminum were unaffected by the flame, and the heat did not spread to the uncoated area of the aluminum sample.

EXAMPLE II

A gallon of the intumescent material of the invention is mixed with 16 ounces of milled fibers using an air jet. The composition was applied to an aluminum sample and tested in the same manner as described in Example I, and the same results were achieved as described in Example I.

EXAMPLE III

A gallon of the intumescent material of the invention is mixed with 16 ounces of short fibers ($\frac{1}{4}$" to $\frac{1}{2}$" bulk length) using an air jet. The composition was applied to an aluminum sample and tested in the same manner as described in Example I, and the same results were achieved as described in Example I.

EXAMPLE IV

A gallon of the intumescent material of the invention is mixed with 16 ounces of long fibers (1" to 4" bulk length) using an air jet. The composition was applied to an aluminum sample and tested in the same manner as described in Example I, and the same results were achieved as described in Example I.

EXAMPLE V

A gallon of the intumescent material of the invention is mixed with 8 ounces of short fibers ($\frac{1}{4}$" to $\frac{1}{2}$" bulk length) and 8 ounces of long fibers (1" to 4" bulk length) using an air jet. The composition was applied to an aluminum sample and tested in the same manner as described in Example I, and the same results were achieved as described in Example I.

EXAMPLE VI

A gallon of the intumescent material of the invention is mixed with 8 ounces of milled fibers and 8 ounces of long fibers (1" to 4" bulk length) using an air jet. The composition was applied to an aluminum sample and tested in the same manner as described in Example I, and the same results were achieved as described in Example I.

EXAMPLE VII

A gallon of the intumescent material of the invention is mixed with 8 ounces of milled fibers, 6 ounces of short fibers ($\frac{1}{4}$" to $\frac{1}{2}$" bulk length), and 6 ounces of long fibers (1" to 4" bulk length) using an air jet. The composition was applied to an aluminum sample and tested in the same manner as described in Example I, and the same results were achieved as described in Example I.

FIG. 1 illustrates how the composition 10 of the present invention operates when applied to a substrate 12, such as wood, aluminum, steel, a fabric, or any other usage mentioned herein. Composition 10 includes refractory fibers 14, in bulk, as described herein in accordance with the present invention, dispersed within or mixed within the intumescent base material 16, as described herein in accordance with the present invention.

Figure 2:
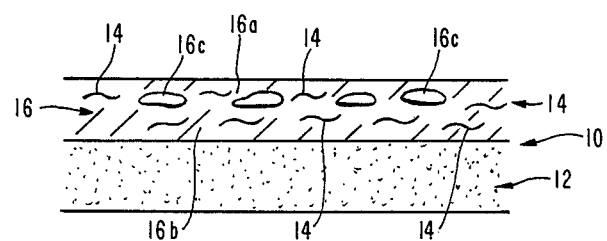
FIG. 2 is a diagrammatic illustration of what happens to the coating material during the initial application of heat.

FIG. 2 illustrates what happens when heat initially reacts with the outer layer 16a of intumescent material and before the heat reaches the inner layer 16b of intumescent material. During this initial stage of heat application, the inner layer 16b is unaffected, but the outer layer 16a swells and expands as a result of air bubbles 16c being formed. These air bubbles 16c build up an outer barrier to protect the substrate 12.

Figure 3:
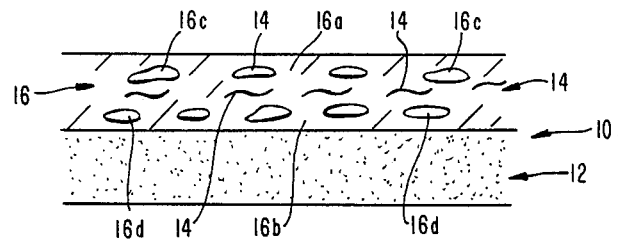
FIG. 3 is a diagrammatic illustration of what happens to the coating material after prolonged application of heat.

FIG. 3 illustrates what happens when the heat builds up and reaches the inner layer 16b. The inner layer 16b starts to swell and expand as a result of air bubbles 16d being formed within the inner layer 16b. These air bubbles 16d build up an inner barrier to protect the substrate 12.

As heat continues to be applied to the composition 10, the air bubbles 16c and 16d increase in number and in size until the air bubbles engage the fibers 14. The fibers 14 then interfere with the air bubbles 16c and 16d continuing to increase in size and thus operate to limit or control their size. Thus, in the present invention, more and smaller air bubbles or air cells are formed, as compared to intumescent materials in the prior art, which typically have no restraints on the increasing size of the air cells being formed. As a result, in the prior art, the air cells eventually become so large that they burst or erupt. Such eruptions interfere with the effectiveness of the intumescent material. This does not happen in the present invention, since fibers 14 limit the size of the inner and outer air cells 16c and 16d, thereby preventing their eruption, so that the composition 10 provides a more effective fire-retardant barrier relative to the substrate 12.

Generally, the coating composition of the present invention can be applied to any substrate, and when heat is applied at any temperature in the range of 1200° F. and 4000° F. and higher, the coating will expand approximately 5 to 12 times the original thickness of the coating that is applied to provide a superior thermal barrier relative to the substrate being protected.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A fire-retardant coating material, comprising:
   a) a fluid intumescent base material having a foaming agent, a blowing agent, a charring agent, a film-forming binder, and a solvent;
   b) a refractory fibrous material dispersed in said intumescent material;
   c) said refractory fibrous material consisting of aluminum oxide ($Al_2O_3$) in the range of 40% to 55% by weight, silicon dioxide ($SiO_2$) in the range of 40% to 55% by weight, and one or more of the compounds selected from the group consisting of ferric oxide ($Fe_2O_3$), titanium dioxide ($TiO_2$), potassium oxide ($KO_2$), sodium oxide ($Na_2O$), and zirconium oxide ($ZrO_2$), said compounds being in the range of 0.1% to 5.0% by weight;
   d) said refractory fibrous material having at least short fibers with a bulk length of 1/32" to 1";
   e) said fire-retardant coating material for coating housing and building frames and the like to render same highly fire resistant.

2. A fire-retardant material in accordance with claim 1, wherein said foaming agent is ammonium phosphate or ammonium polyphosphate.

3. A fire-retardant material in accordance with claim 1, wherein said blowing agent is melamine or urea.

4. A fire-retardant material in accordance with claim 1, wherein said charring agent is dipentaerythritol (DPE) or polyol.

5. A fire-retardant material in accordance with claim 1, wherein said intumescent base material includes titanium dioxide ($TiO_2$), an ammonium phosphate compound, melamine resin, DPE, and vinyl acetate or acrylic resin.

6. A fire-retardant material in accordance with claim 1, wherein said refractory fibrous material consists of aluminum oxide, silicon dioxide, ferric oxide, and titanium dioxide.

7. A fire-retardant material in accordance with claim 1, wherein said refractory fibrous material consists of aluminum oxide, silicon dioxide, potassium oxide, and sodium oxide.

8. A fire-retardant material in accordance with claim 1, wherein said refractory fibrous material consists of aluminum oxide, silicon dioxide, ferric oxide, and zirconium oxide.

9. A fire-retardant material in accordance with claim 1, wherein said refractory fibrous material consists of aluminum oxide, silicon dioxide, titanium dioxide, and zirconium oxide.

10. A fire-retardant material in accordance with claim 1, wherein said refractory fibrous material further includes milled fibers.

11. A fire-retardant material in accordance with claim 1, wherein said refractory fibrous material further includes milled fibers and long fibers having a bulk length of 1" to 4".

12. A fire-retardant material in accordance with claim 1, wherein said refractory material is in the range of 6 ounces to 20 ounces for each gallon of intumescent material.

13. A fire-retardant material in accordance with claim 1, wherein said refractory fibrous material is in the range of 1 ounce to 80 ounces for each gallon of intumescent material.

14. A fire-retardant material in accordance with claim 1, wherein there are 16 ounces of said refractory fibrous material for each gallon of intumescent material.

15. A fire-retardant coating material, comprising:
   a) a fluid intumescent base material having a foaming agent, a blowing agent, a charring agent, a film-forming binder, and a solvent;
   b) a refractory fibrous material dispersed in said intumescent material;
   c) said refractory fibrous material consisting of aluminum oxide ($Al_2O_3$) in the range of 40% to 55% by weight, silicon dioxide ($SiO_2$) in the range of 40% to 55% by weight, and one or more of the compounds selected from the group consisting of ferric oxide ($Fe_2O_3$), titanium dioxide ($TiO_2$), potassium oxide ($KO_2$), sodium oxide ($Na_2O$), and zirconium oxide ($ZrO_2$), said compounds being in the range of 0.1% to 5.0% by weight;
   d) said refractory fibrous material having at least long fibers with a bulk length of at least 1";
   e) said fire-retardant coating material having particular application for coating industrial and commercial structures and the like to render same highly fire resistant.

16. A fire-retardant material in accordance with claim 15, wherein said foaming agent is ammonium phosphate or ammonium polyphosphate.

17. A fire-retardant material in accordance with claim 15, wherein said blowing agent is melamine or urea.

18. A fire-retardant material in accordance with claim 15, wherein said charring agent is dipentaerythritol (DPE) or polyol.

19. A fire-retardant material in accordance with claim 15, wherein said intumescent base material includes titanium dioxide ($TiO_2$), an ammonium phosphate compound, melamine resin, DPE, and vinyl acetate or acrylic resin.

20. A fire-retardant material in accordance with claim 15, wherein said refractory fibrous material consists of aluminum oxide, silicon dioxide, ferric oxide, and titanium dioxide.

21. A fire-retardant material in accordance with claim 15, wherein said refractory fibrous material consists of aluminum oxide, silicon dioxide, potassium oxide, and sodium oxide.

22. A fire-retardant material in accordance with claim 15, wherein said refractory fibrous material consists of aluminum oxide, silicon dioxide, ferric oxide, and zirconium oxide.

23. A fire-retardant material in accordance with claim 15, wherein said refractory fibrous material consists of aluminum oxide, silicon dioxide, titanium dioxide, and zirconium oxide.

24. A fire-retardant material in accordance with claim 15, wherein said refractory fibrous material further includes milled fibers.

25. A fire-retardant material in accordance with claim 15, wherein said refractory fibrous material further includes milled fibers and short fibers having a bulk length of 1/32" to 1".

26. A fire-retardant material in accordance with claim 15, wherein said refractory material is in the range of 6 ounces to 20 ounces for each gallon of intumescent material.

27. A fire-retardant material in accordance with claim 15, wherein said refractory fibrous material is in the range of 1 ounce to 80 ounces for each gallon of intumescent material.

28. A fire-retardant material in accordance with claim 15, wherein there are 16 ounces of said refractory fibrous material for each gallon of intumescent material.

29. A fire-retardant coating material, comprising:
a) a fluid intumescent base material having a foaming agent, a blowing agent, a charring agent, a film-forming binder, and a solvent;
b) a refractory fibrous material dispersed in said intumescent material;
c) said refractory fibrous material consisting of aluminum oxide ($Al_2O_3$) in the range of 40% to 55% by weight, silicon dioxide ($SiO_2$) in the range of 40% to 55% by weight, and one or more of the compounds selected from the group consisting of ferric oxide ($Fe_2O_3$), titanium dioxide ($TiO_2$), potassium oxide ($KO_2$), sodium oxide ($Na_2O$), and zirconium oxide ($ZrO_2$), said compounds being in the range of 0.1% to 5.0% by weight;
d) said refractory fibrous material having at least milled fibers with a bulk length of 2 to 35 microns;
e) said fire-retardant coating material for coating interior finished surfaces of homes, buildings, vehicles, elevators, and the like, and to fabrics, to render same highly fire resistant.

30. A fire-retardant material in accordance with claim 29, wherein said foaming agent is ammonium phosphate or ammonium polyphosphate.

31. A fire-retardant material in accordance with claim 29, wherein said blowing agent is melamine or urea.

32. A fire-retardant material in accordance with claim 29, wherein said charring agent is dipentaerythritol (DPE) or polyol.

33. A fire-retardant material in accordance with claim 29, wherein said intumescent base material includes titanium dioxide ($TiO_2$), an ammonium phosphate compound, melamine resin, DPE, and vinyl acetate or acrylic resin.

34. A fire-retardant material in accordance with claim 29, wherein said refractory fibrous material consists of aluminum oxide, silicon dioxide, ferric oxide, and titanium dioxide.

35. A fire-retardant material in accordance with claim 29, wherein said refractory fibrous material consists of aluminum oxide, silicon dioxide, potassium oxide, and sodium oxide.

36. A fire-retardant material in accordance with claim 29, wherein said refractory fibrous material consists of aluminum oxide, silicon dioxide, ferric oxide, and zirconium oxide.

37. A fire-retardant material in accordance with claim 29, wherein said refractory fibrous material consists of aluminum oxide, silicon dioxide, titanium dioxide, and zirconium oxide.

38. A fire-retardant material in accordance with claim 29, wherein said refractory fibrous material includes short fibers having a bulk length of 1/32" to 1".

39. A fire-retardant material in accordance with claim 29, wherein said refractory fibrous material includes short fibers having a bulk length of 1/32" to 1" and long fibers having a bulk length of 1" to 4".

40. A fire-retardant material in accordance with claim 29, wherein said refractory material is in the range of 6 ounces to 20 ounces for each gallon of intumescent material.

41. A fire-retardant material in accordance with claim 29, wherein said refractory fibrous material is in the range of 1 ounce to 80 ounces for each gallon of intumescent material.

42. A fire-retardant material in accordance with claim 29, wherein there are 16 ounces of said refractory fibrous material for each gallon of intumescent material.

43. A fire-retardant material in accordance with claim 1, wherein said short fibers have a bulk diameter of 1/32" to ½".

44. A fire-retardant material in accordance with claim 15, wherein said long fibers have a bulk diameter of ¼" to ½".

45. A fire-retardant material in accordance with claim 15, wherein said long fibers have a bulk length of 1" to 4".

46. A fire-retardant material in accordance with claim 29, wherein said milled fibers have a bulk diameter of at least 2 microns.

* * * * *